Feb. 27, 1951
V. NELSON
2,543,192
SAW FILING GUIDE
Filed July 12, 1949
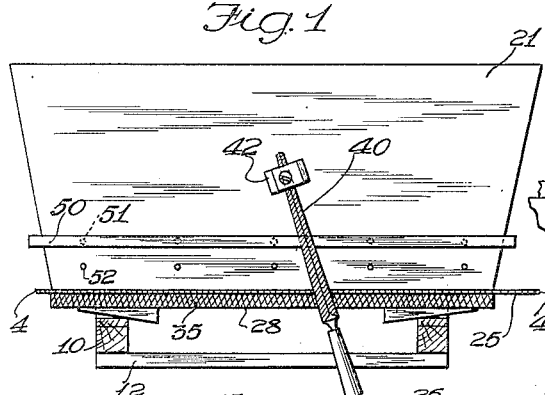
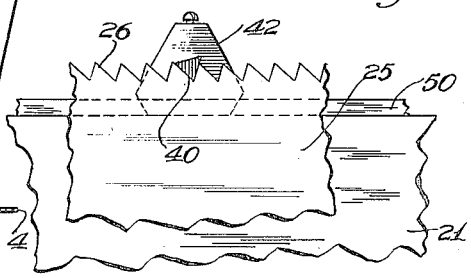
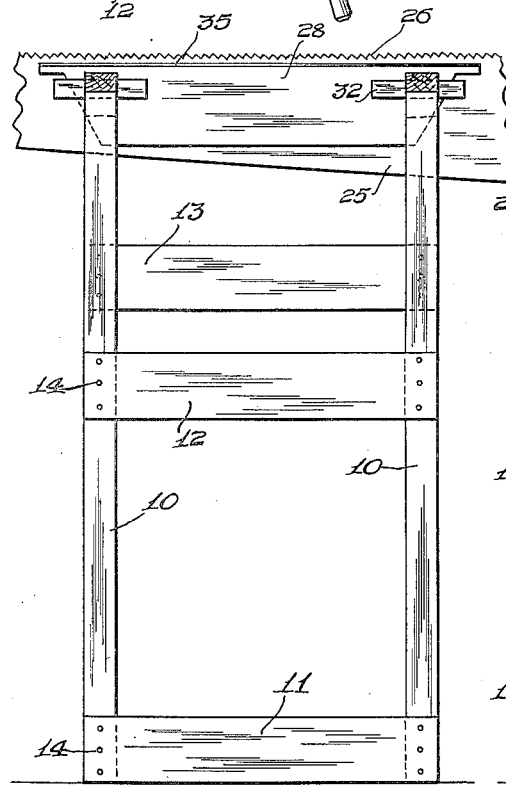
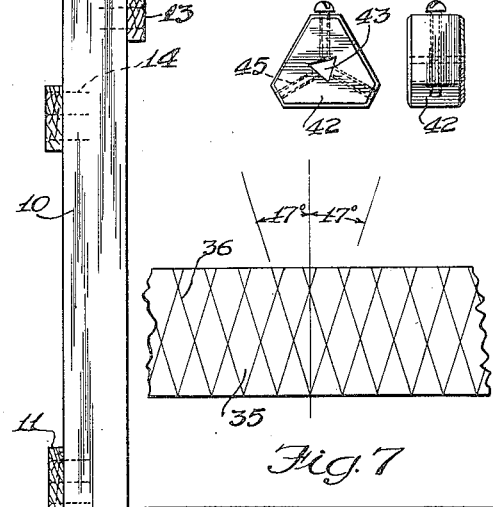
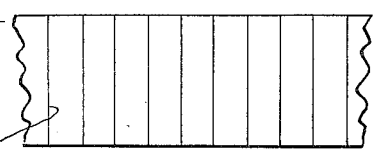
INVENTOR:
Victor Nelson
BY
Milo B. Stevens & Co.
Attorneys.

Patented Feb. 27, 1951

2,543,192

UNITED STATES PATENT OFFICE 2,543,192

SAW FILING GUIDE

Victor Nelson, Chicago, Ill.

Application July 12, 1949, Serial No. 104,211

6 Claims. (Cl. 76—36)

My invention relates to devices for guiding the filing operation when saws are sharpened. This work is usually done by hand, and it is conceivable that errors enter more or less into the direction and position of the file as the same is handled, so that the result is irregular or faulty. It is therefore one object of the present invention to devise a guide which is handily positioned to enable the file to be trained at the proper angle.

A further object is to provide an apparatus for supporting the saw and keeping the file level, whereby to impart the proper profile to the teeth being sharpened.

Another object is to provide a stand in which the saw may be readily clamped, and an attachment for the file to secure its leveling in respect to the stand.

A still further object is to provide a stop element designed to limit the motions of the file and render the action thereof more uniform.

An important object is to construct the novel guide along lines of rigidity, simplicity and durability.

With the above objects in view, and any others which may suggest themselves from the description to follow, a better understanding of the invention may be had by reference to the accompanying drawing, in which—

Fig. 1 is a top plan view, showing the novel guide in use;

Fig. 2 is a front elevation of the showing in Fig. 1;

Fig. 3 is a right-hand side view of the showing in Fig. 2;

Fig. 4 is an enlarged fragmental section on the line 4—4 of Fig. 1;

Fig. 5 is an elevation of a leveling block forming part of the guide;

Fig. 6 is an edge view of Fig. 5;

Fig. 7 is a fragment of a chart tape illustrating a guide for an oblique file stroke; and Fig. 8 is a similar view of a guide for a transverse file stroke.

In acordance with the foregoing, specific reference to the drawing indicates the support for the novel guide to be in the form of a stand 10. The latter may be made in various forms, but the simple one shown involves the use of a pair of 2 x 4 upright posts, these being held by a cross-rail 11 at the bottom, a frontal cross-rail 12 at the center, and a rear cross-rail 13 at a point above the center, finely-dotted lines in Fig. 3 in connection with the cross-rails indicating nails 14 driven from the same into the posts.

The posts 10 are extended with webs 20 from the rear for the support of a table 21. The webs 20 rest on the cross-rail 13; and they are suitably secured to the posts 10. These are cut back slightly from the webs 20 as indicated at 23 to form channels into which the saw 25 may be deposited as shown, the recesses 23 being positioned at suitable heights to position the teeth 26 of the saw a short distance above the table 21 and in a level course.

It is necessary to clamp the saw to the stand before the filing operation is instituted, and a board 28 is employed on the frontal side of the saw to do this. The board is seated in ledges 29 cut in the posts 10 at a given level; and a pair of ledges 30 are also made in the posts at a higher level to define pockets 31 in which a pair of wedge blocks 32 are deposited. Fig. 1 shows that the wedge blocks taper in outward directions; and it is understood that the wedge blocks will cause the board 28 to exert a clamping pressure on the saw when they are driven outwardly. Fig. 2 shows that the ends of the board 28 taper in a downward direction in order to form clearances in case the handle of the saw becomes located close to the stand.

The clamping board 28 is overlaid with a tape 35 which has two crossed series of diagonal lines 36 printed on its upper face. These lines are at an angle of 17° from an imaginary transverse plane through the tape, such angle corresponding to the proper chamfer of teeth in a cross-cut saw. Fig. 7 shows a similar tape which is made with transverse lines 37, these corresponding to the proper cutting of the teeth in a rip saw.

Figs. 1 and 3 show the application of a standard three-cornered file 40 to the apparatus for the purpose of filing the teeth of the saw 25. Fig. 1 shows that the file is positioned at the angle corresponding to the lines 36, so that by following these lines the workman is sure that he is filing the saw at the right angle.

While it is proper to keep the file level while filing a saw, it often happens that one or the other end thereof is dipped or raised out of level, transmitting the fault to the saw teeth. Means are provided to insure the leveling and steady manipulation of the file, such means being a substantially triangular block 42. This block is formed with a central triangular perforation 43 which is suitable to receive the forepart of the file 40; and the block is formed with a tapped bore 45 from each of its corners toward the perforation, to enable a set screw 46 to be applied by way of a chosen bore for the clamping of the block to the file. It is now apparent that, with the rear portion of the file resting on the saw, the forepart employs the block 42 as a rest over the table 21, so that the block slides on the latter when the file is moved forth and back. Thus, the level of the file remains even, resulting in a true cut in the filing zone. When the bottom surface of the block wears unduly, the block may be turned and the screw 46 reset.

The guide also has means for limiting the rearward movement of the file, such means being in the form of a strip 50 mounted on the table 21 in parallelism to the saw 25. The strip 50 has a series of downward studs 51 at longitudinal intervals, such studs being designed to fit in corresponding cavities 52 made in the face of the table 21. Thus, Fig. 1 shows the strip 50 fitted in a given position, and that a second series of cavities 52 occurs for the replacement of the strip in a position nearer to the saw if desired. Thus, while the board 28 forms a stop to the knuckles of the hand holding the file when the latter has taken an advancing stroke, the strip has a similar function in respect to the block 42 when the file has taken the rearward stroke. The strip 50 therefore prevents the file from being drawn back to excess, where it may lose the proper contact with the teeth of the saw.

It will now be evident that the novel guide has a number of meritorious features. Thus, it is erected on a simple stand which is massive enough to prevent vibration, yet made up of material which can be easily assembled in a shop or on the job. Further, the top of the stand combines a table with a saw clamping zone, where means are applied by simple wedge action to firmly clamp the saw to the table, the length of the clamping board 28 insuring uniformity of pressure along the course of the saw teeth. Further, a guiding tape is provided directly in front of the saw in a zone where the operator may readily aline the file with the guide lines of the tape, insuring the proper angularity of the filing stroke. The guiding tape is preferably of gummed or pressure adhesive material, so that it may be changed from the type for cross-cut saws—as shown in Fig. 7—to the type for rip saws as shown in Fig. 8. Further, the leveling block 42 is a simple and reliable element for maintaining the file level; and the block, because of its equilateral form, may be set with either of its free sides on the table 21 to serve the file equally well. Further, the leveling block may be applied to the file with either face, since the thickness of the block is not so great as to materially affect its fit on the file. Finally, the novel guide is composed of a group of parts which are simple, easy to understand and relatively inexpensive to produce, making the guide an apparatus of efficiency from all points of view.

While I have described the invention along specific lines, various minor changes or refinements may be made therein without departing from its principle, and I reserve the right to employ all such changes and refinements as may come within the scope and spirit of the appended claims.

I claim:

1. A saw filing guide comprising a support in which the saw is adapted to be secured with its teeth pointing upwardly, means carried by the support laterally and shortly below said teeth forming a direction guide for the travel of the file, said support comprising a stand with backing elements against which the saw is laid, uprights supporting said backing elements and formed with pairs of cascading recesses opposite the frontal side of the saw, a board applied in the lower recesses of the uprights to said frontal side, and wedge blocks seating in the upper recesses and movable laterally to press the board against the saw and clamp the same to said backing elements.

2. A saw filing guide comprising a support in which the saw is adapted to be secured with its teeth pointing upwardly, means carried by the support laterally and shortly below said teeth forming a direction guide for the travel of the file, said means being located along one side of the saw, stop means on the other side adjustably limiting the rearward stroke of the file, said stop means comprising an attachment for the free end portion of the file, a table extended from the support and on which the attachment is slidable during operation of the file, and a bar attachable on the table at different distances from the saw and effective on the attachment as an abutment at the corresponding end of said stroke.

3. A saw filing guide comprising a support in which the saw is adapted to be secured with its teeth pointing upwardly, means carried by the support laterally and shortly below said teeth forming a direction guide for the travel of the file, said means being located along one side of the saw, and a triangular shaped block on the other side thereof mountable on the file and effective to maintain the proper level thereof.

4. A saw filing guide comprising a support in which the saw is adapted to be secured with its teeth pointing upwardly, means carried by the support laterally and shortly below said teeth forming a direction guide for the travel of the file, said means being located along one side of the saw, a horizontal extension of the support on the other side, and a triangular shaped block mountable on the file to slide on said extension during the operation of the file with the effect of maintaining the proper level thereof.

5. A saw filing guide comprising a support in which the saw is adapted to be secured with its teeth pointing upwardly, means carried by the support laterally and shortly below said teeth forming a direction guide for the travel of the file, said means being located along one side of the saw, a table extended from the support on the other side, and a triangular shaped block having a central triangular opening therein mountable on the file to slide on one of its sides on said table during the operation of the file with the effect of maintaining the proper level thereof.

6. A saw filing guide comprising a support in which the saw is adapted to be secured with its teeth pointing upwardly, means carried by the support laterally and shortly below said teeth forming a direction guide for the travel of the file, wherein the file is of triangular cross-section, said means being located along one side of the saw, a table extended from the support on the other side, and a block of substantially triangular contour mountable on the file to slide on said table during the operation of the file with the effect of maintaining the proper level thereof.

VICTOR NELSON.

REFERENCES CITED

The following references are of record in the file of this patent:

UNITED STATES PATENTS

| Number | Name | Date |
| --- | --- | --- |
| 2,011 | Wemmer | Mar. 18, 1841 |
| 156,856 | Pond | Nov. 17, 1874 |
| 193,182 | Root | July 17, 1877 |
| 586,508 | Morrison | July 13, 1897 |
| 847,599 | Parks et al. | Mar. 19, 1907 |
| 891,807 | Brown | June 23, 1908 |
| 1,263,652 | Davis | Apr. 23, 1918 |
| 1,676,188 | Hugus | July 3, 1928 |
| 1,753,701 | Grant | Apr. 8, 1930 |
| 2,428,556 | Crank | Oct. 7, 1947 |

FOREIGN PATENTS

| Number | Country | Date |
| --- | --- | --- |
| 553,186 | Germany | Sept. 26, 1931 |